United States Patent [19]
Matsuo et al.

[11] 3,994,567
[45] Nov. 30, 1976

[54] ELECTRO-OPTICAL CELL FOR FIELD EFFECT TYPE LIQUID CRYSTAL DISPLAY

[75] Inventors: Makoto Matsuo; Takashi Toida, both of Chiba; Ichiro Tsunoda, Kawasaki, all of Japan

[73] Assignee: Dai Nippon Insatsu Kabushiki Kaisha, Tokyo, Japan

[22] Filed: Nov. 28, 1975

[21] Appl. No.: 635,880

[30] Foreign Application Priority Data
Dec. 4, 1974 Japan............................ 49-139852

[52] U.S. Cl............................. 350/160 LC; 252/299; 428/1
[51] Int. Cl.²........................................... G02F 1/13
[58] Field of Search .................. 350/160 LC; 428/1

[56] References Cited
UNITED STATES PATENTS

| | | |
|---|---|---|
| 3,864,021 | 2/1975 | Katagiri et al................ 350/160 LC |
| 3,912,366 | 10/1975 | Sprokel....................... 350/160 LC |
| 3,941,901 | 3/1976 | Harsch....................... 350/160 LC X |
| 3,947,184 | 3/1976 | Saeva et al. .................. 350/160 LC |
| 3,955,881 | 5/1976 | Yaguchi et al. .............. 350/160 LC |

*Primary Examiner*—Edward S. Bauer
*Attorney, Agent, or Firm*—Spensley, Horn, and Lubitz

[57] ABSTRACT

An electro-optical cell comprises, on an optical path, a pair of electrode base plates and a nematic liquid crystal material having a positive dielectric anisotropy and sandwiched between the electrode base plates, each of which comprises a transparent base plate having an inner surface, an electrode film provided on the inner surface, and a polyimide resin film orientated in one direction and provided on the inner surface over the electrode film, the electrode base plates being mutually disposed on opposite sides of the liquid crystal material with their respective polyimide resin films on their inner sides in mutually facing state with the orientated direction of one polyimide resin film intersecting that of the other as viewed along the optical path. An advantageous feature of this electro-optical cell is that the electrode base plates thereof has durable and heat-resistant orientation which can impart a uniform, initial alignment of ample strength to the liquid crystal.

15 Claims, 2 Drawing Figures

ELECTRO-OPTICAL CELL FOR FIELD EFFECT TYPE LIQUID CRYSTAL DISPLAY

BACKGROUND OF THE INVENTION

This invention relates to an electro-optical cell for liquid crystal display of (electric) field effect type (FE type).

There are two principal types of display apparatus for converting electrical signals into visible information by utilizing the optical anisotropy of a liquid crystal. One of these is the DS type (for example, as disclosed in British Pat. No. 1,167,486) in which a dynamic scattering phenomenon wherein a nematic liquid crystal material having negative dielectric anisotropy scatters light upon the application of an electric field is utilized for displaying. The other type is the FE type (for example, as disclosed in Japanese Laid Open Application No. 11737/1972) in which a nematic liquid crystal material having a positive dielectric anisotropy is interposed and clamped between a pair of electrode base plates whose surfaces have been orientated in mutually intersecting directions thereby to impart optical rotation (a helical structure being imparted to the liquid crystal molecules), and this optical rotation is caused to vary by the application of a suitable electric field and thus utilized for displaying.

The latter apparatus of FE type has such features as lower voltage operation, lower power consumption, and longer serviceable life compared with the former DS type and, for this reason, has wide utility in applications such as various displays and optical shades. In a DS type display device, uniformity of the initial alignment of the liquid crystal is not absolutely necessary from the point of view of operational principle, but in an FE type display device, according to its operational principle, the initial alignment of the liquid crystal is controlled or realigned by the electric field, and the resulting variation of an optical property is utilized, and for this reason, the uniformity of the initial alignment of the liquid crystal (i.e., the uniformity of the alignment when no electric field is applied) is especially important.

Heretofore, various attempts have been made to improve the uniformity of this initial alignment of a liquid crystal. These attempts, however, cannot be considered to have been completely successful in all cases. According to the results of our research, this may be attributed to the reasons set forth below.

First, as a measure known heretofore for obtaining uniformity of the initial alignment of a liquid crystal, there is a method wherein the electrode base plates are rubbed in one direction by a material such as cloth, but by this method, alignments of liquid crystal molecules differ locally, and the uniformity of alignment is not sufficient. Furthermore, the alignment is lost within a short time.

According to another method intended to solve the above described problems, a surface-active agent (surfactant) of a certain kind is additionally used, and the electrode base plates are rubbed in one direction (as disclosed, for example in IBM Technical Disclosure Bulletin Vol. 13, No. 11, Apr. 1971). While the uniformity of alignment is improved to a certain extent by this method, the surfactant does not possess heat resistance and, furthermore, gives rise to deterioration of the liquid crystal material. Then, when an electric field is applied, the surfactant decomposes because of the electric field and undergoes deterioration, and the orientation is destroyed. A further difficulty is that if, in the fabrication of an electro-optical cell after orientation of the electrode base plates, a substance of high softening temperature such as, for example, polyvinylidene fluoride, is used as the sealing material for bonding the pair of electrode base plates, orientation will be lost by the heating temperature at the time of sealing.

Furthermore, a method wherein, for example, the electrode base plates are inclined relative to an evaporation deposition material source, and a material such as silicon oxide or magnesium fluoride is deposited by evaporation thereby to accomplish orientation (referred to as "inclined evaporation orientation method" for convenience) is known (as disclosed, for example, in U.S. Pat. No. 3,834,792) but is accompanied by the problem of weak alignment energy.

With the object of obtaining an electro-optical cell in which the above described various difficulties accompanying the known electro-optical cells for FE type liquid crystal displaying are overcome, we have carried out studies, as a result of which we have made certain findings as set forth below. This invention is based on these findings.

SUMMARY OF THE INVENTION

It is an object of this invention to provide an electro-optical cell provided with electrode base plates to which an orientation effect with an orientation agent of excellent durability and heat resistance has been afforded for imparting a uniform, initial alignment of ample strength to the liquid crystal.

As a result of our studies, we have found that a pair of electrode base plates having an orientated polyimide resin film causes excellent initial alignment of the liquid crystal interposed therebetween, and, moreover, the polyimide resin film has excellent heat resistance, durability, and dissolution resistance, whereby, by using these electrode base plates, an excellent electro-optical cell for FE type liquid crystal displaying can be produced.

Accordingly, the electro-optical cell of this invention for achieving the above stated object is characterized by an organization wherein a pair of electrode base plates, each comprising a transparent base plate, an electrode film provided on one surface of the base plate, and an orientated polyimide resin film provided over the surface of the base plate having the electrode film, are so disposed on an optical path with their polyimide resin films on their inner sides facing each other that the directions of orientation of their polyimide resin films intersect as viewed along the optical path, and a nematic liquid crystal material having positive dielectric anisotropy is sandwiched between the electrode base plates.

As a result of the provision of the polyimide film as described above as an orientation agent, the photoelectric cell of this invention has excellent optical characteristics such as visibility angle, contrast, and response and, at the same time, possesses durability and heat resistance. Moreover, an advantageous feature of the electro-optical cell of this invention is that almost any kind of nematic liquid crystal material having positive dielectric anisotropy can be used therewithin as a liquid crystal material for displaying. Accordingly, this invention makes possible the use of biphenyl liquid crystal materials, which, while possessing excellent stability, could not be fully used heretofore because of their properties of strong dissolving characteristic and difficulty in orientating. In this case, the excellent ability of achieving initial alignment of the liquid crystal and solvent resistance of the orientated polyimide resin film are remarkably exhibited, whereby a reliable electro-optical cell of high stability imparted thereto by the biphenyl liquid crystal material is obtained.

The nature, utility, and further features of the invention will be apparent from the following detailed description, beginning with a consideration of general aspects of the invention and concluding with specific examples of practice illustrating preferred embodiments of the invention, when read in conjunction with the accompanying drawing.

DETAILED DESCRIPTION

Figure 1:
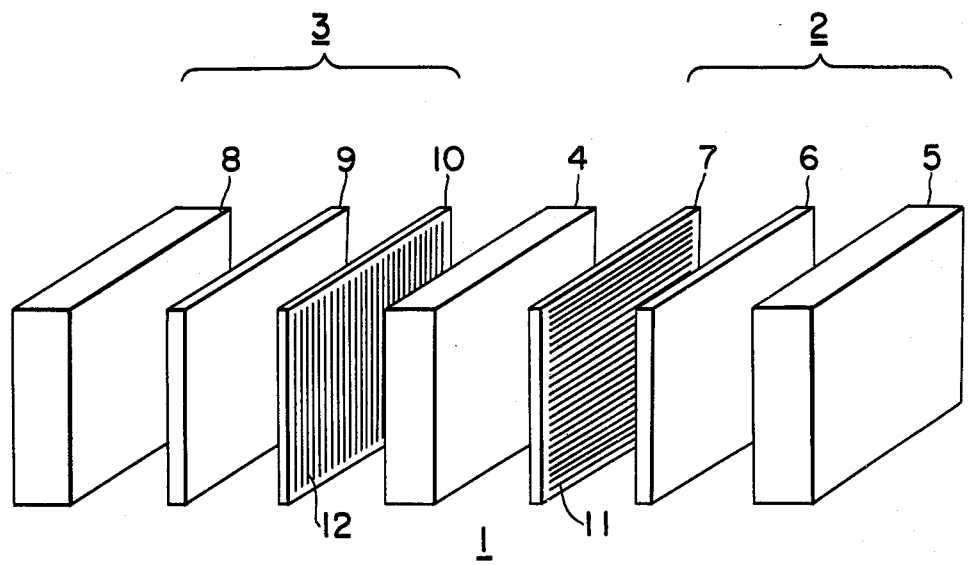
FIG. 1 is a simplified, exploded perspective showing diagrammatically the essential organization of the electro-optical cell of this invention.

Referring first to FIG. 1 showing, in exploded perspective view, the essential elements of the electro-optical cell according to this invention, the cell 1 of the invention comprises, basically, a pair of electrode base plates 2 and 3 and a liquid crystal material 4 interposed therebetween, all in parallelly stacked alignment. The electrode base plate 2 comprises a base plate 5, an electrode film 6 disposed on the inner surface of the base plate 5, and a polyimide resin film 7 disposed on the inner side of the electrode film 6, that is, between the electrode film 6 and the liquid crystal material 4. Similarly, the electrode base plate 3 comprises a base plate 8, an electrode film 9 on the inner surface of the base plate 8, and a polyimide resin film 10 on the inner side of the electrode film 9.

Figure 2:
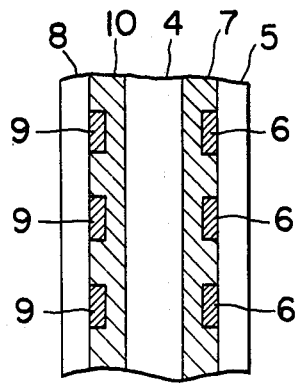
FIG. 2 is a fragmentary, longitudinal section showing the assembled structure of an electro-optical cell of the invention.

The polyimide resin films 7 and 10 are respectively orientated, and the electrode base plates 2 and 3 are so disposed that the orientated directions 11 and 12 of these polyimide resin films 7 and 10 intersect each other. At least one lead wire (not shown) is connected to each of the electrode films 6 and 9 for applying voltage thereto. While the orientated directions of the pair of electrode base plates may be any other than parallel directions, it is perferable that their angle of intersection be 90° from various considerations such as visibility angle, contrast, and response. It will be obvious that the actual construction of the electro-optical cell, illustrated in exploded view of FIG. 1, is one in which the elements thereof are in closely laminated arrangement as illustrated by one example in FIG. 2.

It is necessary that the above mentioned two base plates 5 and 8 have insulating property and be transparent. Examples of materials suitable for these base plates are glass and transparent synthetic resins. On the inner surface of each of these plates, a transparent electrode film 6 (or 9) is formed by an ordinary process. For example, a transparent electro-conductive film such as a film composed principally of tin oxide, indium oxide, or the like can be formed by a process such as a spraying process or a vacuum evaporation deposition process. Each of these electrode films is worked by a process such as photo-etching to impart thereto a specific pattern such as, for example, one or more numerals or characters or a pictorial pattern. In these patterns, of course, the electrode film can be left remaining in a part thereof or at the periphery thereof.

Next, in accordance with this invention, a polyimide resin film is formed on one part including the electrode film or the entire surface of each base plate 5 (or 8) having the transparent electrode film.

The term "polyimide resin" as herein used is intended to mean any polymers containing recurring imide bonds in the main chain thereof and include polyimides containing recurring imide bonds, polyamide-imides containing recurring amide bonds and imide bonds, and polyesterimides containing recurring ester bonds and imide bonds.

Polyimide resins as defined above are constituted by polymers having imide bonds and, in general, are insoluble in solvents. For this reason, it is preferable, in order to form the polyimide resin film on a base plate in this invention, to resort to the process of dissolving a polyamic acid, which is a precursor of the polymers constituting the polyimide resins, in a solvent described hereinafter, applying the resulting solution as a coating on the base plate, and thereafter heat treating the film thereby to cause dehydration and ring closure and cause the film to acquire imide bonds.

A polyamic acid as a precursor of the above mentioned polyamide-imides is synthesized by polyaddition of a carboxylic acid anhydride and an oligodiamine obtained from an excessive diamine and a dicarboxylic acid.

A polyamic acid as a precursor of the above mentioned polyester-imides is synthesized by polyaddition of a carboxylic acid dianhydride having an ester group and a diamine.

The above mentioned carboxylic acid dianhydride having an ester group is obtained from, for example, trimellitic acid and one of various diols.

A polyamic acid as a presursor of the above mentioned polyimides in their narrower sense, is synthesized by polyaddition of a carboxylic acid dianhydride and a diamine.

These polyaddition reactions are carried out under ordinary conditions, that is, under an anhydrous condition and a temperature of 50° C or less.

Examples of the above mentioned diamine are: m-phenylenediamine, p-phenylenediamine, m-xylenediamine, p-xylenediamine, 4,4'-diaminodiphenylether, 4,4'-diaminodiphenylmethane, 3,3'-dimethyl-4,4'-diaminodiphenylmethane, 3,3', 5,5'-tetramethyl-4,4'-diaminodiphenylmethane, 2,2'-bis (4-aminophenyl)-propane-4,4'-methylenedianiline, benzidine, 4,4'-diaminodiphenylsulfide, 4,4'-diaminodiphenylsulfone, 1,5-diaminonaphthalene, 3,3'-dimethylbenzidine, 3,3'-dimethoxybenzidine, 2,4-bis($\beta$-amino-tertbutyl) toluene, bis(4-$\beta$-amino-tert-butylphenyl)ether, and 1,4-bis(2-methyl-4-aminopentyl)benzene.

Examples of the above mentioned diols are: hydroquinone, bisphenol A, dichlorobisphenol A, tetrachlorobisphenol A, tetrabromobisphenol A, bisphenol F, bisphenol ACP, bisphenol L, bisphenol V, bisphenol S, and 4,4'-dihydrophenylether.

Examples of the above mentioned carboxylic acid dianhydride are: pyromellitic anhydride, 2,3,6,7-naphthalenetetracarboxylic anhydride, 3,3',4,4'-diphenyltetracarboxylic anhydride, 1,2,5,6-naphthalenetetracarboxylic anhydride, 2,2',3,3'-diphenyltetracarboxylic anhydride, thiophene-2,3,4,5-tetracarboxylic anhydride, 2,2-bis (3,4-biscarboxyphenyl) propane anhydride, 3,4-dicarboxyphenylsulfone anhydride, perylene-3,4,9,10-tetracarboxylic anhydride, bis(3,4-dicarboxyphenyl) ether anhydride, and 3,3',4,4'-benzophenonetetracarboxylic anhydride.

For the above specified diamines, diols, and carboxylic dianhydrides, aromatic compounds are preferable in all cases on the point of heat resistance.

A polyamic acid prepared in this manner can be coated on a substrate base material by dissolving the polyamic acid in a solvent such as dimethylformamide, dimethylacetamide, dimethylsulfoxide, and N-methylpyrolidone to form a solution of from 0.01- to 40-percent concentration and applying this solution by a method such as brush painting, dipping, spin coating, or spraying. After coating, the coating film is heat treated and dried at a temperature of from 100° to 350° C, preferably from 200° to 300° C thereby to form a polyimide resin film on the substrate base material.

The thickness of this polyimide resin film is controlled to be from 0.01 to 50 microns, preferably from 0.1 to 5 microns. We have found that a film thickness less than 0.01 micron results in weak orientation power and a film thickness greater than 50 microns results in difficulty in producing a uniform coating and in deterioration of electrical response.

The orientation processing of this polyimide resin film can be carried out by a method such as, for example, by rubbing in a constant direction by means of a material such as a cloth or a brush. This orientation can be carried out in any direction relative to the electrode pattern of each electrode in accordance with factors such as the visibility angle and is not limited to a direction parallel to an edge of the electrode base plate as indicated in FIG. 1.

In the forming of a film of an orientation processed polyimide resin film on the surface of a base plate containing the electrode film, infiltration of electric charge from the electrode part can be eliminated and the consumption of electrical power reduced by forming beforehand a film of a thickness of 0.01 to 100 microns consisting of a polyorganosilane on the surface of the base plate containing the electrode film. In the forming of this film of a polyorganosilane on the electrode base plate surface containing the electrode film, the monomer or prepolymer of the organosilane is dissolved in a solvent such as n-hexane, benzene, toluene, or xylene thereby to prepare a solution of a concentration of from 0.1 to 20 percent. This solution is applied as a coating on the above mentioned base plate surface by any of the ordinary coating methods named above and then heated thereby to polymerize the organosilane and, at the same time, to dry the coating film by evaporating off the solvent.

An organosilane suitable for use according to this invention comprises one organosilane or a mixture of two or more organosilanes which is represented by the general formula $RnSiX_{4-n}$ ($n=1,2,3$).

In this formula, X is a halogen such as chlorine, an alkoxy group such as a methoxy group or an ethoxy group, an acyloxy group such as an acetoxy group, or another hydrolyzable functional group. Furthermore, the group R in this formula is a saturated aliphatic hydrocarbon group such as methyl or ethyl, an unsaturated aliphatic hydrocarbon group such as vinyl or an alkenyl group, or an aromatic hydrocarbon group such as phenyl. A hydrogen atom of these hydrocarbon groups may substituted by an unsaturated group such as vinyl or an alkenyl group, hydroxyl, carbonyl, a halogen group such as chlorine, bromine, or fluorine, or another functional organic group. Examples of the groups thus substituted are chloromethyl, $\gamma,\gamma,\gamma$-trifluoropropyl, and $\gamma$-aminopropyl.

In the above formula, the groups represented by X of the number (4-n) and the group represented by R of the number n may respectively be the same or different.

In the above described manner, the pair of electrode base plates provided with orientated polyimide resin films are so disposed that their respective polyimide resin films are on their inner sides, and that they face each other with their orientated directions in mutually intersecting state. For example, the electrode base plates are maintained apart by a constant distance by means such as a spacer interposed therebetween, and the periphery is bonded and fixed by a sealing material comprising a spacer and/or an adhesive.

Examples of materials suitable for use as the above mentioned sealing material are organic materials such as polyester resins, epoxy resins, polyamide resins, acrylic resins, polyimide resins, polyethylene, fluororesins, vinyl chloride resins, vinyl chloride-vinyl acetate copolymers, $\alpha$-polyolefin resins, polyethylene waxes, microcrystalline waxes, and like single polymers, copolymers, and mixtures thereof and inorganic materials such as low-melting-point glasses. In addition, if an electrical insulative layer is interposed, materials such as indium and various solder materials can be used.

By dispersing beforehand in this sealing material, in a quantity of from 30 to 400 percent by weight relative to the sealing material, a drying agent such as silica gel, magnesia, activated alumina, or anhydrous copper sulfate, infiltration of moisture into the interior of the electro-optical cell can be prevented, and the liquid crystal material thus sealed can exhibit its desirable characteristics over a long time.

For installing the sealing material, a method such as that wherein a sealing material of frame skeleton film is installed or that wherein an ink composition containing the above mentioned material as its principal ingredient is printed by a method such as the silk-screen printing method can be used.

Of the sealing materials mentioned above, an inorganic material is one which has desirable features such as tight sealing performance and little effect on the liquid crystal. However, since a high temperature is required at the time of sealing, it has been difficult to use such an inorganic material as a sealing material of an electro-optical cell employing an electrode base plate to which a known orientation agent has been applied. However, a polyimide resin used in this invention, though depending on the kind thereof, is capable of withstanding a high temperature of the order of 300° to 450° C and does not lose its orientation effect even at high temperatures, whereby it has made possible the use of inorganic materials such as glass frit, which require sealing at high temperature. For this reason, it is possible by the practice of this invention to fabricate an electro-optical cell with excellent tight-sealing property.

After the pair of electrode base plates have been caused to adhere and be fixed by way of the above mentioned sealing material by a measure such as heat pressure bonding of the pair of electrode plates, a nematic liquid crystal material having a positive dielectric anisotropy is poured through a pouring port provided beforehand, for example, in a part of a base plate or a sealing part. Then the pouring port is sealed by using a material such as a low melting point metal or a material selected from those enumerated above as sealing materials, whereupon the electro-optical cell of this invention is obtained. Alternatively, the liquid crystal material is caused to drip onto one electrode base plate and is sandwiched between that electrode base plate and the other electrode base plate with a spacer interposed therebetween, and then the resulting laminate structure is sealed.

The above mentioned liquid crystal material may be a single compound or a composition. A single compound or a composition which, as a whole, has a positive dielectric anisotropy (that is, a characteristic wherein the dielectric constant along the direction of the major axis of the molecules is greater than the dielectric constant in the direction perpendicular to the direction of the major axis of the molecules) is used. For this nematic liquid crystal material, a single nematic liquid crystal compound comprising one member of nematic liquid crystal compound having a positive dielectric anisotropy (referred to as Np liquid crystal compounds) or a composition comprising at least one member of Np liquid crystal compounds and at least one nematic liquid crystal compounds having a negative dielectric anisotropy (referred to as Nn liquid crystal compounds) and, as a whole, exhibiting a positive dielectric anisotropy is used. In this connection, a liquid crystal material of a composition comprising two or more constituents gives a wide range of operational temperature of the display element, and is therefore desirable.

Examples of Np liquid crystal compounds suitable for use as set forth above, are for example, as follows:

anils: p-alkoxybenzylidene-p'-cyanoaniline represented by the general formula

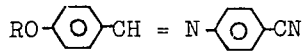

(R: $n - C_mH_{2m+1}$, $m = 1$ to 8); p-alkylcarboxybenzylidene-p'-cyanoaniline represented by the general formula

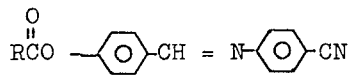

(R: $n-C_mH_{2m+1}$, $m = 1$ to 6); p-alkylbenzylidene-p'-cyanoaniline represented by the general formula

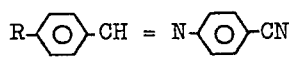

(R: $n - C_mH_{2m+1}$, $m = 3$ to 6); p-cyanobenzylidene-p'-alkoxyaniline represented by the general formula

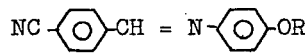

(R: $N-C_mH_{2m+1}$, $m = 1$ to 8); p-cyanobenzylidene-p'-alkylaniline represented by the general formula

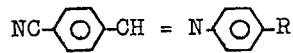

(R: $n - C_mH_{2m+1}$, $m = 3$ to 6); and p-alkoxybenzylidene-p'-alkylaniline represented by the general formula

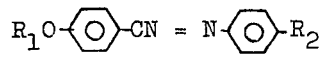

$R_1$: $C_mH_{2m+1}$, $m = 1$ to 6, $R_2$: $C_{m'}H_{2m'+1}$, $m' = 3$ to 7);

biphenyls: p-alkyl-,p-alkoxy-,p-(p-alkylphenyl)-, or p-(p-alkoxy phenyl) -p'-cyanobiphenyl represented by the general formula

(A: $C_mH_{2m+1}$, $C_mH_{2m+1}O$,

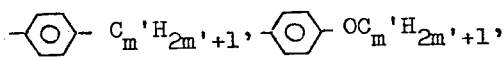

$m + 4$ to 15, $m' = 2$ to 24)

azoxybenzenes: p-alkyl-p'-alkylazoxybenzene represented by the general formula

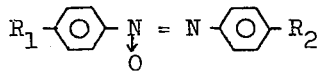

($R_1$, $R_2$: $n-C_mH_{2m+1}$, $m = 4$ to 7);

benzoates: p-cyanophenyl-p'-n-alkylbenzoate represented by the general formula

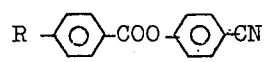

(R: $C_mH_{2m+1}$, $m = 3$ to 8); p-cyanophenyl-p'-alkoxybenzoate represented by the general formula

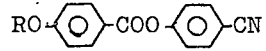

(R: $C_mH_{2m+1}$, $m = 4$ to 7); p-alkoxyphenyl-p'-cyanobenzoate represented by the general formula

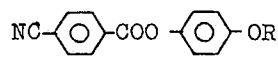

(R: $C_mH_{2m+1}$, $m = 4$ to 7); and p-alkylphenyl-p'-cyanobenzoate represented by the general formula

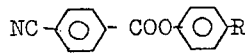

(R: $C_mH_{2m+1}$, $m = 4$ to 8); and azo-compounds: p-cyano-p'-alkoxyazobenzene represented by the general formula

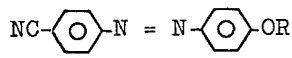

(R: $C_mH_{2m+1}$, $m = 4$ to 7).

Examples of Nn liquid crystal compounds are p-methoxybenzylidene-p'-n-butylaniline and p-ethoxybenzylidene-p'-n-butylaniline. These compounds are used in a liquid crystal composition having a positive dielectric anisotropy as a whole by adding thereto at least one Np liquid crystal compound which exhibits a great positive dielectric anisotropy.

The uniformity of the initial alignment of this nematic liquid crystal material having a positive dielectric anisotropy can be further improved by adding thereto an optically active compound such as a cholesteryl compound, or a biphenyl derivative, phenylbenzoate derivative, benzylideneaniline derivative, or azoxybenzene derivative having an optically active substituent in a quantity of from 0.01 to 5 percent by weight with respect to the nematic liquid crystal material. Desirably this additive quantity is of an order of from 0.01 to 2 percent by weight which will not change the optical characteristics of the display device.

An electro-optical cell of this invention fabricated as described above not only has excellent durability and heat resistance but, as a result of remarkably improved initial alignment of the liquid crystal, has particularly excellent electro-optical characteristics such as contrast, visibility angle, and response Because of the use therein of a polyimide resin film as an orientation agent, the above described electro-optical cell of this invention possesses the advantageous feature of not being limited in the kind of liquid crystal material for displaying. For this reason it is also possible to use, as a liquid crystal material for displaying, biphenyl lieuqi crystal materials comprising or containing one or more biphenyl liquid crystal compounds selected from p-alkyl-, p-alkoxy-, p-(p-alkylphenyl)-, and p-(p-alkoxyphenyl)-p'-cyanobypenyls represented by the general formula

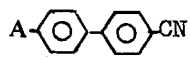

(where A: $C_mH_{2m+1}, C_mH_{2m+1}O$,

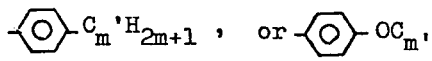

$H_{2m'+1}$; $m = 4$ to 15 (preferably $m = 5$ to 9); and $m' = 2$ to 24).

The use of these biphenyl liquid crystals materials has been desired because they are compounds having very high stability when compared with other nematic liquid crystal materials. However, because of their high dissolving power, these biphenyl liquid crystal easily impair the orientation agent or cause difficulty in alignment by the aforementioned method of rubbing each electrode base plate in one direction with a material such as cloth or the aforementioned inclined evaporation orientation method. For these and other reasons, these biphenyl liquid crystals heretofore could not be fully utilized.

On the basis of the characteristics possessed by the polyimide resin film used therein, particularly the solvent resistance, and excellent ability of aligning the liquid crystal, the electro-optical cell of this invention makes possible the use of biphenyl liquid crystal materials as liquid crystal materials for displaying. In the use of biphenyl liquid crystals as liquid crystals materials for displaying in accordance with this invention, compositions containing one or more kinds of the above mentioned biphenyl compounds and, in addition, Np and/or Nn liquid crystal compounds other than biphenyl compounds or compositions comprising one or more of these biphenyl compounds are used. In all cases, it is desirable that an optically active compound be added similarly as described hereinbefore. Furthermore, when, within the above mentioned biphenyl compound, a triphenyl compound (which is classified in biphenyl compounds herein) is added as one part thereof in a quantity of the order of less than 5 percent by weight relative to the entire nematic liquid crystal material, the nematic region becomes wider, particularly nematicisotropic transition temperature being raised, which is a desirable result.

The electro-optical cell of this invention as described above can be effectively used in combination with a polarizer such as a linear polarizing plate or a circular polarizing plate, a reflecting plate, and the like to constitute a liquid-crystal displaying device of field effect type and thereby advantageously applied to a wide variety of displaying apparatuses such as electronic desk-top calculators, various time pieces, and counter display panels.

In order to indicate more fully the nature and utility of this invention, the following examples of practice constituting preferred embodiments of this invention together with comparison examples are set forth, it being understood that these examples are presented as illustrative only and that they are not intended to limit the scope of the invention. Throughout these examples and comparison examples, quantities expressed in "parts" are parts by weight.

EXAMPLE 1.

An aromatic carboxylic acid dianhydride obtained from trimellitic acid and hydroquinone, and 4,4'-diaminodiphenylether were polyadded to produce a polyamic acid which is a precursor of polyester-imide. A 2-percent solution of this polyamic acid in methylacetamide was prepared. Pieces of glass for electrode base plates which had electroconductive films of indium oxide were etched with specific patterns and then washed by an ordinary method thereby to produce two pairs of electrode base plates, which were then immersed in the above mentioned solution. After this immersion, these electrode base plates were heat treated at 200° C for 1 hour and caused to undergo dehydration and ring closure, and a polyester-imide film was thus formed on each electrode base plate.

Then each of this electrode base plates provided with the polyester-imide film was orientated by rubbing in one direction with a cloth. Thereafter, the two plates of each pair of these plates thus orientated were bonded and fixed with their surfaces coated with the polyester-imide film on the inner sides and facing each other and with their respective orientated directions at right angles to each other by interposing between their seal parts a hot-melt type polyester film of 15-micron thickness and heat-pressure bonding.

Thereafter, into the spaces between the two pairs of plates through respective previously provided pouring ports, a mixture liquid crystal material (A) prepared by adding 0.02 gram (g.) of (+) p-isoamyloxy-p'-cyanobiphenyl to 10 g. of a composition composed of 50 parts of p-methoxybenzylidene-p'-n-bytilaniline, 50 parts of p-ethoxybenzylidene-p'-n-butylaniline, 60 parts of p-n-propoxybenzylidene-p'-cyanoaniline and 5 parts of p-n-amylbenzylidene-p'-cyanoaniline, and a biphenyl mixed liquid crystal material (B) composed of 100 parts of 4-pentyl-4'-cyanobiphenyl, 10 parts of 4-amyloxy-4'-cyanobiphenyl, and 5 parts of 4-heptyloxy-4'-cyanobiphenyl were respectively introduced, and the pouring ports of the two pairs of plates were sealed with an epoxy resin. Thus, electro-optical cells (1) and (2) of the invention were fabricated.

Then, on the opposite surfaces of each of these two electro-optical cells, linear polarizing plates were respectively disposed with the polarization direction of each parallel to the orientation direction of the adjacent electrode base plate thereby to assemble a display device. In each of these display devices, the electro-optical cell of this invention was found to exhibit characteristics such as uniform contrast and wide angle of visibility. Furthermore, when each of these devices was left for 4 weeks at 80° C, no destruction of orientation was observable. Thus, the high heat resistance of these devices was demonstrated. In addition, the durability of these devices was found to be high since the uniformity of their orientation was not lost even after 10,000 hours of use (with 5V, 32Hz sine wave).

EXAMPLE 2

A 1-percent solution in methylacetamide of a polyamic acid which is a precursor of polyamid-imide, and which was obtained by polyaddition of N,N'-bis(3-amino-phenyl) isophthalamide and pyromellitic anhydride was prepared. Next, pieces of glass for electrode base plates having electroconductive films of tin oxide were etched with specific patterns and then washed by an ordinary method thereby to produce two pairs of electrode base plates, which were then coated with the above mentioned solution by the spinning coating method and heat treated at 250° C for 20 minutes to cause dehydration and ring closure. Thus, a polyamide-imide film was formed on one surface of each electrode base plate.

Then each of these electrode base plates provided with the film was orientated by rubbing in one direction with a cloth. Thereafter, thermosetting acryl ink was printed by the silk screen technique on the seal part of each glass plate, and the two plates of each pair of these plates were heat bonded and thus secured together with their surfaces coated with the polyamide-imide films on the inner sides and facing each other and with their respective orientated directions at right angles to each other.

Thereafter, into the spaces between the pairs of plates, through respective previously provided pouring ports, a mixture liquid crystal material (C) composed of 50 parts of p-methoxybenzylidene-p'-n-butylaniline, 50 parts of p-ethoxybenzylidene-p'-n-butylaniline and 5 parts of p-n-propylbenzylidene-p'-cyanoaniline, and a biphenyl mixture liquid crystal material (D) composed of 100 parts of 4-pentyl-4'-cyanobiphenyl, 25 parts of 4-hexyl-4'-cyanobiphenyl, 5 parts of 4-amyloxy-4'-cyanobiphenyl, 3 parts of 4-heptyloxy-4'-cyanobiphenyl and 0.1 part of (+) 4-isoamyloxy-4'-cyanobiphenyl were respectively introduced, and the pouring ports were sealed with an epoxy resin. Thus, electro-optical cells (3) and (4) of the invention were fabricated.

Then, similarly as in Example 1, display devices were fabricated with these electro-optical cells (3) and (4), whereupon it was found that these cells of this invention respectively exhibited excellent characteristics similarly as in Example 1.

In addition, a display device of reflective type was assembled by positioning a reflector plate on the outer side of one of the polarizing plates of each of the above mentioned display devices. The two display devices thus assembled also exhibited excellent characteristics.

EXAMPLE 3

A 1-percent solution in N-methylpyrolidone of a polyamic acid which is a precursor of a polyimide, and which was obtained by polyaddition of pyromellitic anhydride and 4,4'-diaminodiphenylether was prepared. Pieces of glass for electrode base plates having electroconductive films of indium oxide were etched with specific patterns and thereafter washed by an ordinary method thereby to produce four pairs of electrode base plates, which were immersed in the above mentioned solution. After this immersion, the plates were heat treated at 350° C for 5 minutes to cause dehydration and ring closure. In this manner, a polyimide film was formed on one surface of each plate.

Then each of these electrode base plates was orientated by rubbing it in one direction with a cloth, and thereafter a thermosetting acrylic ink was applied by printing by the silk screen method on the sealing part of each glass plate. The two plates of each of four pairs of these plates for fabricating cells were heat bonded and thus secured together with their surfaces provided with the polyimide films on the inner sides and facing each other and with their respective orientated directions perpendicular to each other.

Thereafter, into the spaces between the four pairs of plates thus secured, through respective previously provided pouring ports, mixed liquid crystal materials (E), (F), (G), and (H) of the following compositions were respectively poured, and then the pouring ports were sealed.

The mixed liquid crystal material (E) was composed of 40 parts of p-methoxybenzylidene-p'-n-butylaniline, 60 parts of p-ethoxybenzylidene-p'-n-butylaniline, 20 parts of p-n-butoxyphenyl-p'-cyanobenzoate, and 10 parts of p-n-amyloxyphenyl-p'-cyanobenzoate.

The mixed liquid crystal material (F) was composed of 20 parts of p-methoxybenzylidene-p'-n-butylaniline, 40 parts of p-ethoxybenzylidene-p'-n-butylaniline, 40 parts of n-hexyloxybenzylidene-p'-n-butylaniline, 15 parts of p-n-butoxyphenyl-p'-cyanobenzoate, 15 parts of p-n-heptyloxyphenyl-p'-cyanobenzoate, and 1 part of cholesterylacetate.

The biphenyl mixed liquid crystal material (G) was composed of 100 parts of 4-pentyl-4'-cyanobiphenyl and 20 parts of 4-hexyl-4'-cyanobiphenyl.

The biphenyl mixed liquid crystal material (H) was composed of the above specified mixed liquid crystal material (G) to which 2 parts of 4-(p-pentylphenyl)-4'-cyanobiphenyl had further been added.

Thus, electro-optical cells (5) through (8) according to this invention were fabricated.

Then, similarly as in Example 1, display devices were fabricated with these cells, whereupon it was found that the cells of this Example 3 all exhibited excellent characteristics comparable to those of the cells of Example 1. Furthermore, it was found that the addition of the 4-(p-pentylphenyl)-4'-cyanobiphenyl in the electro-optical cell (8) resulted in a widening of the nematic temperature region, and operation at 60° C was possible. In addition, the heat resistances of these electro-optical cells (5) through (8) of the instant Example 3 were found to be very good. The orientation effect was not lost, and, moreover, the uniformity of the orientation did not vary even after heat treatment at 80° C for 1 week.

EXAMPLE 4

On the surfaces of four pairs of base plates provided with electrode films as specified in Example 3, four kinds of organosilane solutions a through d as specified in the following table were respectively applied and heated at 80° C for 3 hours to cause polymerization and drying thereof. Thereafter, by the procedure set forth in Example 3, polyimide films were formed on the films of polyorganosilane films thus applied, electro-optical cells (9) through (12) were fabricated with the afore-described mixed liquid crystall material (H) as the liquid crystal material for displaying, and respective four kinds of display device were further fabricated.

| No. | ORGANOSILANE SOLUTION |
|---|---|
| a | 1 to 10 % solution of diethoxydimethylsilane in toluene. |
| b | 1 to 10 % solution of dimethyldichlorosilane in toluene. |
| c | 1 to 10 % solution of a 1 : 1 mixture of methyltriethoxysilane and dimethyldiethoxysilane in benzene. |
| d | 1 to 10 % solution of diethoxydiphenylsilane in toluene. |

All four display devices thus fabricated were found to have excellent characteristics similarly as those described in Example 3 and exhibited a remarkable increase in durability such as their capability of withstanding a long period of continuous electric field application under a high humidity condition (30° C, 90% RH). More specifically, when a sine wave of 6V (effective value) and 32 Hz was applied for 1,000 hours, the increase in a.c. current value was from 2 to 4 times in the case of Example 3, whereas, in the instant Example 4, this increase less than 2 times. Furthermore, in the devices of the instant Example 4, there was no variation of contrast at the time of voltage application or loss of uniformity of contrast after the above described continuous electric field application.

EXAMPLE 5

Three pairs of electrode base plates orientated in the same manner as set forth in Example 3 were assembled with their respective orientation directions intersecting at (a) 38°, (b) 52°, and (c) 45°. Then, through previously provided pouring ports in the plate assemblies, a mixed liquid crystal material (I) composed of 50 parts of 4'-cyanophenyl-4-n-heptylbenzoate, 50 parts of 4'-cyanophenyl-4-n-butylbenzoate, and 0.1 part of cholesterylchloride was introduced into the spaces between the plates, and the pouring ports were then sealed with an epoxy resin. Thus, electro-optical cells (13),(14), and (15) according to this invention were fabricated.

Then, similarly as in Example 1, display devices were fabricated with these cells, whereupon it was found that the electro-optical cells of the instant Example 4 exhibited excellent characteristics comparable to those in Example 3.

Comparison Example 1

Two pair of glass plates for electrode base plates with indium oxide deposited by evaporation on their surfaces on one side were prepared according to Example 1 except that no orientation agents whatsoever were used. The surface of each plate thus coated with indium oxide was rubbed directly with a cloth in one direction and thus orientated. Then, with these plates, electro-optical cells (16) and (17) were fabricated according to Example 1 by using respectively the mixed liquid crystal materials (A) and (B). Thereafter, display devices were fabricated with these cells similarly as in Example 1.

As a result, it was found that the cell (16) had orientation irregularities of bright and dark at the display part when an electric field was applied. Furthermore, the orientation began to deteriorate after 3 hours at 50° C and was totally destroyed after 2 days, which indicated that the durability and heat resistance of this cell (16) were poor. In the cell (17), there was no alignment whatsoever of the liquid crystal.

Comparison Example 2

Four pairs of glass plates for electrode base plates with indium oxide deposited by evaporation on their surfaces on one side were prepared. These plates were then coated by immersion in a 0.5-percent aqueous solution of polyoxyethylene nonylphenyl ether as an orientation agent and thereafter dried by heating in vacuum.

Then the surface of each plate coated as described above was rubbed with a cloth in one direction and thus orientated to fabricate an electrode base plate. Each pair of electrode base plates were then secured with their respective orientation directions perpendicular to each other, and electro-optical cells (18) and (19) were fabricated according to Example 1 with two pairs of the plates respectively with the mixed liquid crystal materials (A) and (B). In addition, similarly as in Example 1, display devices were fabricated with these cells.

As a result, it was found that the transmittances of all electro-optical cells when no electric field was applied were poor because of poor alignment of the liquid crystals. Furthermore, there were irregularities of bright and dark at the display parts when an electric field was applied, and irregularities in orientation were apparent. Moreover, after 100 hours at 60° C, the cell (18) lost almost all of its aligning ability, while in the cell (19), orientation was completely destroyed, whereby no durability whatsoever was exhibited.

In addition, by the same procedure as that described above, except for the use of the aforedescribed mixed liquid crystal materials (D) and (G) in place of the liquid crystal materials (A) and (B), electro-optical cells (20) and (21) were fabricated. However, these cells also exhibited poor aligning ability similarly as the above described cell (19), and its orientation was completely destroyed in a short time.

We claim:

1. An electro-optical cell for field effect type liquid crystal display comprising, on an optical path: a pair of electrode base plates each comprising a transparent base plate having an inner surface, an electrode film provided on said inner surface, and a polyimide resin film provided on said inner surface over the electrode film, and orientated in one direction, the electrode base plates being mutually disposed with their respective polyimide resin films on their inner sides in mutually facing state and with the orientated direction of one polyimide resin film intersecting that of the other as viewed along the optical path; and a nematic liquid crystal material having a positive dielectric anisotropy and interposed between the two electrode base plates.

2. An electro-optical cell as claimed in claim 1 in which the polyimide resin film is a film made of a material selected from the group consisting of polyimides, polyamide-imides, and polyester-imides.

3. An electro-optical cell as claimed in claim 1 in which the polyimide resin film is made of a polyimide.

4. An electro-optical cell as claimed in claim 3 in which the polyimide is prepared by subjecting to dehydration and ring closure a polyamic acid formed by polyaddition of a carboxylic acid dianhydride and a diamine.

5. An electro-optical cell as claimed in claim 3 in which the polyimide is prepared by subjecting to dehydration and ring closure a polyamic acid formed by polyaddition of an aromatic carboxylic acid dianhydride and an aromatic diamine.

6. An electro-optical cell as claimed in claim 3 in which the polyimide is prepared by subjecting to dehydration and ring closure a polyamic acid formed by polyaddition of pyromellitic anhydride and 4,4'-diaminodiphenylether.

7. An electro-optical cell as claimed in claim 1 in which the thickness of the polyimide resin film is from 0.1 to 5 microns.

8. An electro-optical cell as claimed in claim 1 in which a film of a polyorganosilane is interposed between the surface having the electrode film of each transparent base plate and the adjacent polyimide film.

9. An electro-optical cell as claimed in claim 8 in which the polyorganosilane is represented by the general formula $RnSiX_{4-n}$, where n is an integer from 1 through 3; X is a member selected from the group consisting of hydrolyzable functional groups, particularly a halogen group, alkoxy, and acyloxy; and R is a member selected from the group consisting of substituted and unsubstituted aliphatic and aromatic hydrocarbon groups.

10. An electro-optical cell as claimed in claim 1 in which the nematic liquid crystal material contains at least one kind of biphenyl liquid crystal compound.

11. An electro-optical cell as claimed in claim 10 in which the biphenyl liquid crystal compound is a biphenyl compound expressed by the general formula

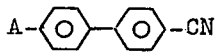

$(-A: -C_mH_{2m+1},$

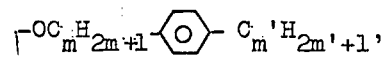

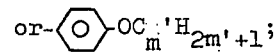

$m = 4$ to $15$, $m' = 2$ to $24$).

12. An electro-optical cell as claimed in claim 1 in which the nematic liquid crystal material comprises at least one kind of biphenyl liquid crystal compound.

13. An electro-optical cell as claimed in claim 12 in which the biphenyl liquid crystal compound is a biphenyl compound expressed by the general formula

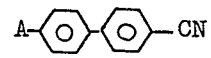

$(-A: -C_mH_{2m+1}, -OC_mH_{2m+1},$

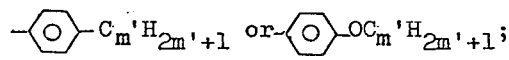

$m = 4$ to $15$, $m' = 2$ to $24$).

14. An electro-optical cell as claimed in claim 1 in which the nematic liquid crystal material contains from 0.01 to 5.0 percent by weight of an optically active compound.

15. An electro-optical cell as claimed in claim 14 in which the optically active compound is a member selected from the group consisting of cholesteryl compounds, and compounds having an optically active substituent selected from the group consisting of biphenyl derivatives phenylbenzoate derivatives, benzylideneaniline derivatives and azoxybenzene derivatives.

* * * * *